United States Patent
Kiiskinen et al.

(10) Patent No.: US 10,259,151 B2
(45) Date of Patent: Apr. 16, 2019

(54) METHOD OF FORMING A FIBROUS PRODUCT

(71) Applicant: Teknologian tutkimuskeskus VTT Oy, Espoo (FI)

(72) Inventors: Harri Kiiskinen, Espoo (FI); Esa Torniainen, Muijala (FI); Karita Kinnunen, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 0 days.

(21) Appl. No.: 15/021,708

(22) PCT Filed: Sep. 15, 2014

(86) PCT No.: PCT/FI2014/050704
§ 371 (c)(1),
(2) Date: Mar. 14, 2016

(87) PCT Pub. No.: WO2015/036659
PCT Pub. Date: Mar. 19, 2015

(65) Prior Publication Data
US 2016/0221233 A1  Aug. 4, 2016

(30) Foreign Application Priority Data
Sep. 13, 2013 (FI) ..................... 20135922

(51) Int. Cl.
*D21J 3/00* (2006.01)
*B29C 44/02* (2006.01)
(Continued)

(52) U.S. Cl.
CPC .......... *B29C 44/355* (2013.01); *B29C 44/022* (2013.01); *B29C 44/06* (2013.01);
(Continued)

(58) Field of Classification Search
CPC ......... D21F 11/002; D21F 1/08; D21H 21/56; D21H 13/40; D21H 21/24; D21H 27/30;
(Continued)

(56) References Cited

U.S. PATENT DOCUMENTS 3,007,840 A * 11/1961 Wilcox ................. D21F 11/002
162/101
3,716,449 A * 2/1973 Gatward ............... D21F 11/002
162/101
(Continued)

FOREIGN PATENT DOCUMENTS

GB        2317401 A1 * 10/1973 ............ D21F 11/002
GB        1395757 A  *  5/1975 ............ D21F 11/002
(Continued)

OTHER PUBLICATIONS

Smook, G. A, "Handbook for Pulp & Paper Technologist," 1992, Angus Wilde Publications, 2nd Edition, pp. 7-8. (Year: 1992).*
(Continued)

*Primary Examiner* — Jose A Fortuna
(74) *Attorney, Agent, or Firm* — Seppo Laine Oy

(57) ABSTRACT

The present invention relates to a method of forming a molded fibrous product, comprising the steps of foaming an aqueous suspension of natural fibers, optionally in combination with synthetic fibers, to provide a first fibrous foam, a surfactant may be added to aid the foaming, feeding the fibrous foam into a mold, mechanically withdrawing a part of the water contained in the foam to produce a solidified, moist fibrous composition, and evaporating water from the solidified, moist fibrous composition to produce a dry fibrous product.

27 Claims, 3 Drawing Sheets

(51) Int. Cl.

| | |
|---|---|
| *B29C 44/06* | (2006.01) |
| *D21F 11/00* | (2006.01) |
| *D21H 11/00* | (2006.01) |
| *D21H 17/09* | (2006.01) |
| *D21H 21/24* | (2006.01) |
| *B29C 44/58* | (2006.01) |
| *B29C 44/34* | (2006.01) |
| *B29C 67/20* | (2006.01) |
| *D21H 21/56* | (2006.01) |
| *B29K 25/00* | (2006.01) |
| *B29L 31/00* | (2006.01) |
| *B29K 105/00* | (2006.01) |
| *B29K 105/04* | (2006.01) |
| *B29K 105/16* | (2006.01) |
| *B29K 401/00* | (2006.01) |
| *B29K 501/12* | (2006.01) |

(52) U.S. Cl.
CPC ...... *B29C 44/3407* (2013.01); *B29C 44/3415* (2013.01); *B29C 44/58* (2013.01); *B29C 67/202* (2013.01); *D21F 11/002* (2013.01); *D21H 11/00* (2013.01); *D21H 17/09* (2013.01); *D21H 21/24* (2013.01); *D21H 21/56* (2013.01); *D21J 3/00* (2013.01); *B29K 2025/06* (2013.01); *B29K 2105/0005* (2013.01); *B29K 2105/04* (2013.01); *B29K 2105/16* (2013.01); *B29K 2401/00* (2013.01); *B29K 2501/12* (2013.01); *B29K 2995/0063* (2013.01); *B29L 2031/712* (2013.01)

(58) Field of Classification Search
CPC . D21H 23/10; D21H 27/00; D21J 3/00; D21J 3/10; D21J 3/12; D21J 5/00; D21J 7/00; B32B 5/024; B29C 44/022; B29C 44/06; B29C 44/3407; B29C 44/3415; B29C 44/355; B29C 44/58; B29C 67/20; B29C 70/12; Y10T 428/24612
See application file for complete search history.

(56) References Cited

U.S. PATENT DOCUMENTS

| | | | | |
|---|---|---|---|---|
| 3,871,952 | A * | 3/1975 | Robertson | D21F 11/002 162/101 |
| 3,938,782 | A * | 2/1976 | Robertson | D21F 11/002 366/101 |
| 4,183,782 | A * | 1/1980 | Bondoc | C03C 25/00 162/156 |
| 4,443,299 | A * | 4/1984 | Cheshire | D21F 9/003 162/264 |
| 4,882,114 | A * | 11/1989 | Radvan | B29C 35/04 264/129 |
| 5,013,405 | A * | 5/1991 | Izard | C04B 26/02 162/101 |
| 5,720,851 | A * | 2/1998 | Reiner | D21F 11/002 162/101 |
| 5,853,538 | A * | 12/1998 | Reiner | D21F 11/002 162/101 |
| 5,904,809 | A * | 5/1999 | Rokman | D21F 1/08 162/101 |
| 6,238,518 | B1 * | 5/2001 | Rokman | D21F 9/003 162/101 |
| 6,531,078 | B2 * | 3/2003 | Laine | D21F 11/002 264/122 |
| 6,682,215 | B2 * | 1/2004 | Kinsley, Jr. | B01F 3/04453 162/101 |
| 6,921,459 | B2 * | 7/2005 | Kinsley, Jr. | D21F 11/002 162/101 |
| 7,416,636 | B2 * | 8/2008 | Blomqvist | D21F 11/002 162/101 |
| 7,641,764 | B2 * | 1/2010 | Yoshida | D21H 13/16 162/125 |
| 9,334,610 | B2 * | 5/2016 | Kinnunen | D21H 11/18 |
| 9,663,901 | B2 * | 5/2017 | Heiskanen | D21H 11/18 |
| 2002/0117768 | A1 | 8/2002 | Laine et al. | |
| 2003/0193836 | A1 * | 10/2003 | Kinsley, Jr. | B01F 3/04453 366/307 |
| 2005/0039870 | A1 * | 2/2005 | Blomqvist | D21F 11/002 162/101 |
| 2010/0273376 | A1 * | 10/2010 | Jaffee | B32B 5/26 442/17 |
| 2015/0114581 | A1 * | 4/2015 | Kinnunen | D21H 11/18 162/125 |
| 2016/0221233 | A1 * | 8/2016 | Kiiskinen | D21H 21/24 |
| 2016/0229088 | A1 * | 8/2016 | Ojala | B29C 51/12 |
| 2016/0289453 | A1 * | 10/2016 | Cai | D21H 21/56 |
| 2018/0171560 | A1 * | 6/2018 | Heiskanen | D21F 11/002 |

FOREIGN PATENT DOCUMENTS

| | | | |
|---|---|---|---|
| JP | 2003227058 A | 8/2003 | |
| JP | 2010215872 A | 9/2010 | |
| KR | 2303630 A * | 2/1997 | ............ C08J 9/0061 |
| WO | WO0058342 A1 | 10/2000 | |
| WO | WO 02068743 A2 * | 9/2002 | ............ D21F 11/002 |
| WO | WO2012006714 A1 | 1/2012 | |

OTHER PUBLICATIONS

Smook, "Handbook for Pulp & paper Technologists," Angus Wilde Publications, second edition, pp. 1-8. (Year: 1992).*
Linder et al., "Efficient Purification of Recombiant Proteins Using Hydrophobins as Tags in Surfactant-Based Two-Phase Systems", Biochemistry, vol. 43, pp. 11873-11882, 2004.
Vazquez-Villegas et al., "Low-abundant protein extraction from complex protein sample using a novel continuous aqueous two-phase systems device", J. Sep. Sci., pp. 391-399, 2013.

* cited by examiner

METHOD OF FORMING A FIBROUS PRODUCT

TECHNICAL FIELD

The present invention concerns a method of forming a lightweight fibrous product useful as a packaging material. In such a method a fibrous foam is moulded, dewatered and dried. In particular the invention relates to a method according to the preamble of claim 1.

Further, the invention relates to a lightweight fibrous product according to the preamble of claim 30. Such a product is useful in various applications, for example, as cushioning material in packaging, as sound proofing or as a thermal insulator.

BACKGROUND ART

Practically all consumer goods need protective packaging to cushion the goods during storage and transportation. It is recognised that there are numerous solutions for packaging and cushioning various goods depending on the physical properties of the goods to be protected and the degree of protection required relating to its application. Typical cushioning solutions include loose fills e.g. polystyrene pieces, paper or creped cellulose, corrugated paperboard structures (honeycomb) and foam structures (expanded polystyrene, Styrofoam, polypropylene), moulded pulp (egg trays) and inflated products (bubble wrap).

These prior art products have the disadvantages that they, in the case of loose fills, are not integrated into the packaging and may undergo granular convection, moving about the goods to be protected leaving some parts of the goods unprotected, or in the case of inflated products, may become deflated leaving the goods unprotected. Foam structures, such as expanded polystyrene, are of particular concern due to their environmental impact i.e. they are not recyclable, they do not decompose naturally once their useful lifespan is expired and they produce toxic gases on burning. The ever increasing price of crude oil also makes the production of expanded polystyrene less commercially attractive than potential alternatives.

More recent advances in the technology provide material made from foamed cellulose. For example, GB 2 303 630 discloses a product obtained by foaming cellulose with adhesives and chemical foaming agents inside a mould of the required shape. On heating, the chemical foaming agents decompose or react to form a gas that foams the mixture. The foamed cellulose is then dried.

A different approach is suggested in JP 5 263 400 A discloses a biodegradable, porous product made from a slurry of shredded paper strips. The slurry of shredded paper strips is heated, treated with a bonding chemical and dried by vacuum in a mould to give a moulded product.

Various other technical solutions for producing porous products are known.

US2002117768 discloses layered three-dimensional products, such as three-dimensional filters formed by single layered formed from a single application of foam, or a laminate formed of several layers of different fibrous foams. The fibers in the foam are short cut fibers, having an average length of 0.05 mm (millimeters) or less. The layers are relatively thin.

WO2012006714 discloses a method of manufacturing an ultralow density composite comprising natural fibers. In the known method, an alkaline pulp is foamed produce the ultralow density foam comprising a three dimensional reticular structure comprising a diffusion interphase interlocking the natural fibers.

JP2010215872 discloses a method of producing freeze-dried porous structures from microcellulose fibres.

None of the discussed products are useful as packaging materials or as sound proofing materials or thermal insulators.

SUMMARY OF INVENTION

Technical Problem

It has been found that issues concerning sustainability, recyclability and environmental impact in general make the provision of a satisfactory method of forming a moulded fibrous product problematic.

Solution to Problem

It is an aim of the present invention to eliminate at least a part of the problem relating to the prior art and to provide a novel method of forming a moulded fibrous package or packaging material.

More specifically, the method according to the present invention is characterised by what is stated in claim 1.

It is a further aim of the invention to provide a low density moulded fibrous product. The product according to the present invention is characterised by what is stated in claim 30.

The invention is based on the surprising finding that by means of the method, fibres suspended in water and then foamed, adhere to each other by means of hydrogen bonds, when dewatered and dried in a mould.

Advantageous Effects of Invention

The present invention provides a simple, inexpensive, environmentally sound method of forming a moulded fibrous product from an aqueous suspension of fibres.

In preferred embodiments, moulded fibrous light weight product materials described herein are made of recyclable biomaterials e.g. wood fibers and thus can be recycled as paper or as packaging board.

When compared to conventional "new bio packaging concepts" the present technology is readily reduced to practice thanks to the availability of the raw materials. For a single household, recycling can be carried out by composting and burning of fibre cushioning package, to mention just a few alternatives.

By incorporating thermoplastic fibres, structures can be produced which, for example, have a hard surface layer (skin) which is suitable as a printing substrate. The synthetic fibres further improve the bonding of the fibres.

Other features and advantages will become apparent from the following description.

BRIEF DESCRIPTION OF DRAWINGS

Next the invention will be examined more closely with the aid of a detailed description and with reference to the attached drawings, in which.

DESCRIPTION OF EMBODIMENTS

The present invention relates to a method of forming a moulded fibrous product, comprising the steps of foaming an aqueous suspension of natural fibres, optionally in combination with synthetic fibres, to provide a first fibrous foam, a surfactant optionally being added to aid the foaming, feeding the fibrous foam into a mould, mechanically withdrawing a part of the water contained in the foam to produce a solidified, moist fibrous composition, and evaporating water from the solidified, moist fibrous composition to produce a dry fibrous product.

The present moulded fibrous products are three-dimensional objects typically having a smallest dimension (e.g. thickness) of at least 1 mm, preferably at least 5 mm, in particular at least 10 mm or more, for example their smallest dimension is 20 to 100 mm. The objects can be formed by one fibrous layer or by a plurality of overlapping layers. The objects have an inner part and a surface part, the latter having a thickness or depth (normal distance from the surface area) of at least 0.1 mm. In some cases the thickness of the surface part is roughly 0.1 to 50 mm, typically about 0.1 to 10 mm. By incorporating synthetic polymers into the surface part of the objects improved mechanical properties, such as hardness or smoothness, can be achieved.

Figure 1:
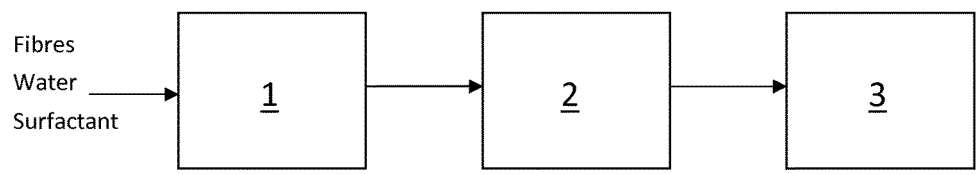
FIG. 1 is a schematic flow chart showing the basic steps of a method according to the present invention of forming a moulded fibrous product.

FIG. 1 illustrates one exemplary embodiment of a method of forming a moulded fibrous product in which fibres, water and surfactant undergo foaming 1 to provide a fibrous foam, which is then fed into a mould. A part of the water is then withdrawn mechanically 2 from the fibrous foam to produce a solidified, moist fibrous composition. Water is then evaporated 3 from the moist fibrous composition to produce a dry fibrous product.

For the purpose of the present technology the terms "fibre" and "fibres" have broad meanings.

Typically, the fibre or fibres have an average aspect ratio (average length:average thickness) of 6 or more, in particular 10 or more. The average length of the fibres is greater than 0.1 mm, in particular greater than 0.5, for example greater than about 1 mm, suitably greater than about 1.5 mm, preferably in the range from about 2 up to 100 mm, such as 2 up to 50 mm. Typically at least 75%, in particular at least 80%, suitable at least 85%, of the fibres will meet those criteria, said percentage being calculated by weight of the total weight of the fibres. The composition of fibres may contain individual fibres having lengths greater than the ones mentioned above. The above ranges are applicable separately to both the natural fibres (as defined below) as well as synthetic or thermoplastic fibres. Preferably, the fibres are uncut.

The source of the fibres may be derived from various sources. The fibres can be natural or synthetic, animal, vegetable or mineral, or diverse mixtures of any of these sources. The fibres may be virgin fibres, the fibres may also be 'recycled' from various sources by e.g. defibering. The fibres may be a mixture of fibres and 'recycled' fibres.

The terms "fibre" and "fibres" cover a large variety of materials including but not limited to thermomechanical pulp fibres, chemithermomechanical pulp fibres, kraft pulp fibres, sulphite pulp fibres, soda pulp fibres, dissolving pulp fibres, fluff pulp fibres, NBSK pulp fibres, SBSK pulp fibres, recycled pulp fibres, deinked pulp fibres, organosolv pulp fibres, bleached pulp fibres, as examples of natural fibres. Examples of synthetic fibres (thermoplastic polymer fibers) include but are not limited to polyester fibres, aramid fibres, acrylonitrile fibres, polylactide fibres, aromatic polymide fibres, polyamide fibres, polyurethane fibres, polyethylene fibres, polypropylene fibres and combinations thereof.

A method of forming a moulded fibrous product is disclosed. In one embodiment an aqueous suspension of natural fibres, optionally in combination with synthetic fibres, is foamed to provide a first fibrous foam. The fibrous foam is fed into a mould. Part of the water contained in the foam is withdrawn mechanically to produce a solidified moist fibrous composition. Water is evaporated from the solidified moist fibrous composition to produce a dry fibrous product.

For some applications only natural fibres are preferred e.g. if method of disposal is of concern, natural fibres from renewable resources are selected. By varying the proportion of synthetic fibres used in the process, the physical properties of the moulded fibrous product can be tailored according to its intended application.

In an embodiment the aqueous suspension is foamed to a fibrous foam having an air content of more than 30%, preferably 50 to 90%, by volume of the foam. In a further embodiment the fibrous foam is provided by a method selected from intensive mixing of the aqueous suspension of the fibres, reducing of pressure, optionally by increasing temperature of the aqueous suspension of the fibres, dispersing of air into the aqueous suspension of the fibres by injection and a combination of any of the aforementioned methods.

A further embodiment comprises producing a dry fibrous product wherein the fibres of the product are bonded together essentially by hydrogen bonds. The hydrogen bonds may be formed e.g. between hydroxyl groups on the fibres' surfaces.

The bonding provided by hydrogen bonds can be supplemented by bonding achieved with synthetic fibres, which for example are melted during the production. In particular, in one embodiment, hydrogen bonds supply the bonding within the material formed by natural fibres and thermoplastic polymers achieve bonding in or on the surface of the object.

Thermal bonding by melting of synthetic polymers will be discussed below.

In a particular embodiment the fibre consistency of the aqueous suspension is 0.1-10%, preferably 0.5 to 5% based on the weight of the suspension. In a preferred embodiment the moist fibrous foam has a water content of up to 70% by volume, preferably 30 to 50% by volume of the suspension. In a still further embodiment the dry fibrous product has a water content of 12% by weight or less.

Further embodiments disclose the incorporation of a surfactant into the aqueous suspension. In one embodiment a surfactant is incorporated into the aqueous suspension to enhance foam formation. In a further embodiment the surfactant is selected from inorganic surfactants, organic surfactants and mixtures thereof. In a particular embodiment the surfactant is selected from the group of calcium sodium 2,2',2'',2'''-(1,2-ethanediyldinitrilo)tetraacetate (1:2:1), hexadecanol, hexadecyl palmitate, cholesterol, ethanolamine, D-fructose, gelatine, D(+) glucose monohydrate, gum arabic, D(−) mannitol, oleic acid, sorbitol, polyethylene glycol, polyvinyl alcohol, potassium iodate, 1,2-propanediol, sodium dodecyl sulfate, starch, sucrose, disodium dihydrogen ethylenediaminetetraacetate, wax, D(+)-xylose, azodicarbonamide (ADCA), azobisformamide (ABFA), azobisisobutyronitrile (AIBN), N,N'-denitroso pentamethylene tetrarnine (DPT), P-toluenesulfonyl hydrazide (TSH), P,P'-Oxybis(benzenesulfonyl hydrazide) (OBSH), ammonium carbonate and sodium hydrogen carbonate, and mixtures thereof.

One embodiment discloses forming a homogenous multiphase mixture by foaming of the aqueous suspension of natural fibres, which optionally contains synthetic fibres.

A further embodiment discloses removing water from the fibrous foam by suction.

In one embodiment the mould comprises an internal surface for receiving the fibrous foam and an opposite external surface, at least one side of the internal surface being made of a permeable material adapted to retain fibrous material and to allow passage of water from the internal surface to the external surface. In a further embodiment the mould comprises two internal surfaces which face each other and which allow for removal of water in opposite directions. In a particular embodiment the mould comprises on the internal surface a protruding three-dimensional male part corresponding to a cavity in the dry fibrous product. In a suitable embodiment the male part is covered on the internal surface with a permeable material.

The above embodiment is particularly suitable for producing packages in particular cushioning packages. Examples include packages for fragile products which can be placed in the cavity. Such a cavity efficiently cushions the product.

In one embodiment the suction is applied to the fibrous foam from the external surface of the mould. In a preferred embodiment the suction subjects the fibrous foam to a pressure.

In a still further embodiment evaporation is effected by means selected from the group of microwaves, infrared waves, air impingement, air drying, and convective drying and combinations thereof.

Further embodiments disclose feeding further fibrous foams into the mould. In one embodiment a second fibrous foam of fibres is fed into the mould on top of the first fibrous foam so as to cover at least a portion of the first fibrous foam fed into the mould. In a further embodiment further fibrous foams are fed into the mould on top of preceding fibrous foams to form a multilayered dry fibrous product.

One embodiment comprising removing water and drying of the second or further fibrous fibrous foam(s) is disclosed. A further embodiment comprises withdrawing by suction a part of the water contained in the first foam before feeding the second fibrous foam or feeding the first and the second and further foams consecutively into the mould before applying suction in order to withdraw water from the foams.

In a preferred embodiment the fibres of the first fibrous foam are selected from the group of thermomechanical pulp fibres, chemithermomechanical pulp fibres, kraft pulp fibres, sulphite pulp fibres, soda pulp fibres, dissolving pulp fibres, fluff pulp fibres, NBSK pulp fibres, SBSK pulp fibres, recycled pulp fibres, deinked pulp fibres, organosolv pulp fibres, bleached pulp fibres and mixtures thereof, optionally in combination with synthetic polymer fibres, such as thermoplastic polymer fibres.

Examples of synthetic fibres which can be used in the first fibrous foam(s) include polyester fibres, aramid fibres, acrylonitrile fibres, polylactide fibres, aromatic polymide fibres, polyamide fibres, polyurethane fibres, polyethylene fibres, polypropylene fibres and combinations thereof.

In a further embodiment the fibres of the second or further fibrous foam(s) are selected from the group of thermomechanical pulp fibres, chemithermomechanical pulp fibres, kraft pulp fibres, sulphite pulp fibres, soda pulp fibres, dissolving pulp fibres, fluff pulp fibres, NBSK pulp fibres, SBSK pulp fibres, recycled pulp fibres, deinked pulp fibres, organosolv pulp fibres, bleached pulp fibres and mixtures thereof, optionally in combination with synthetic polymer fibres, such as thermoplastic polymer fibres.

Examples of synthetic fibres which can be used in the second fibrous foam(s) include polyester fibres, aramid fibres, acrylonitrile fibres, polylactide fibres, aromatic polymide fibres, polyamide fibres, polyurethane fibres, polyethylene fibres, polypropylene fibres and combinations thereof.

In addition to the above-disclosed synthetic polymer material fibres, which typically comprise only one polymer material, it is also possible to use bicomponent fibres. Such fibres are typically formed by a first polymer material forming a core of the fibre and being surrounded by a second polymer material.

Preferably, the first material has a first melting point and the second has a second melting point, which is different from the first melting point. Usually the first material has a higher melting point that the second material surrounding it, whereby the fibre essentially maintains its shape during melting.

By applying heat to the material, the synthetic fibres (or the surface layer thereof) will melt and achieve bonds within the material formed by the natural fibres, thus improving interfibre bonding. Suitably the bicomponent fibres are located in the surface part of the objects to achieve stronger bonds and a tougher or harder surface.

Naturally, it is possible to enhance bonding by incorporating chemical binding agents, such as latexes, or nanocellulose.

The present three-dimensional objects can be given a hard surface by heating the surface optionally in combination with pressing, or by building structures having several overlapping layers.

The methods used for evaporation can also be used for melting of the synthetic (thermoplastic) polymer portion. Thus, in particular microwaves, infrared waves, air impingement, air heating, and convective heating and combinations thereof can be used.

The weight ratio of natural to synthetic fibres is generally about 1000:1 to 1:100, in particular 500:10 to 10:100, for example 100:10 to 100:100.

In a suitable embodiment the fibres of the second or further fibrous foam(s) are different from those of the first or of the preceding fibrous foam(s). In a preferred embodiment the fibres of the first fibrous foam are selected from chemical fibres which optionally are bleached.

Further embodiments disclose a lightweight moulded fibrous product. One embodiment discloses a moulded fibrous product having a density of 5 to 100 kg/m$^3$ and an air content of 90 to 99.5% by volume, said product containing fibres, which are bonded together essentially by hydrogen bonds. In an embodiment the product is essentially free from thermoplastic bonding agents. In a suitable embodiment the product comprises bonding agents selected from the group of chemical bonding agents, nanocellulose and a mixture thereof. However, as discussed above, the product may contain at least some synthetic fibres, such as thermoplastic fibers for achieving improved bonding, e.g. in the surface layer thereof.

In one embodiment the product comprises at least a first layer, particularly a second layer, suitably multiple layers. In a further embodiment at least one layer comprises mechanical pulp fibres, selected from the group of mechanical pulp fibres, thermomechanical pulp fibres, chemithermomechanical pulp fibres, and a combination thereof. In a particular embodiment at least one layer comprises chemical pulp fibres, selected from the group of chemithermomechanical pulp fibres, kraft pulp fibres, sulphite pulp fibres, soda pulp fibres, dissolving pulp fibres, fluff pulp fibres, NBSK pulp fibres, SBSK pulp fibres, recycled pulp fibres, deinked pulp fibres, organosolv pulp fibres, bleached pulp fibres, polyester fibres, aramid fibres, acrylonitrile fibres, polylactide fibres, aromatic polymide fibres, polyamide fibres, polyurethane fibres, polyethylene fibres, polypropylene fibres and a combination thereof.

Figure 2A:
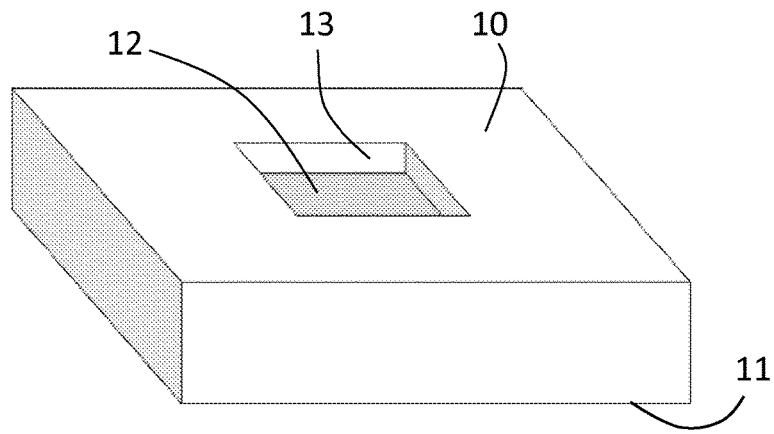
FIG. 2A shows in axonometric depiction a moulded fibrous product according to a first embodiment.

FIG. 2A illustrates an exemplary embodiment of a moulded fibrous product of the invention suitable for use as a packaging material, comprised of a single layer 11 of moulded fibres, said single layer 11 of moulded fibres comprising an upper surface 10 and a lower surface (not shown), the upper surface characterised in that it comprises a moulded cavity having a lower surface 12 and side surfaces 13, said lower surface 12 and side surfaces 13 having a form appropriate to an item or items that is(are) to be packed.

Figure 2B:
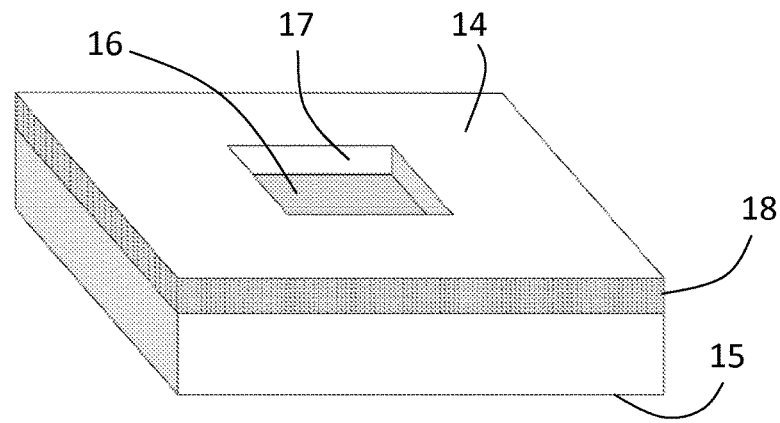
FIG. 2B is another axonometric depiction of a second embodiment comprising a multilayer fibrous product.

FIG. 2B illustrates a further embodiment of a moulded fibrous product of the invention suitable for use as a packaging material, comprised of a first layer 18 of moulded fibres and a second layer 15 of moulded fibres, said second layer 15 aligned with said first layer 18 providing a moulded fibrous product with one upper surface 14 and one lower surface (not shown). The upper is surface characterised in that it comprises a moulded cavity having a lower surface 16 and side surfaces 17, said lower surface 16 and side surfaces 17 having a form appropriate to an item or items that is(are) to be packed.

Figure 3A:
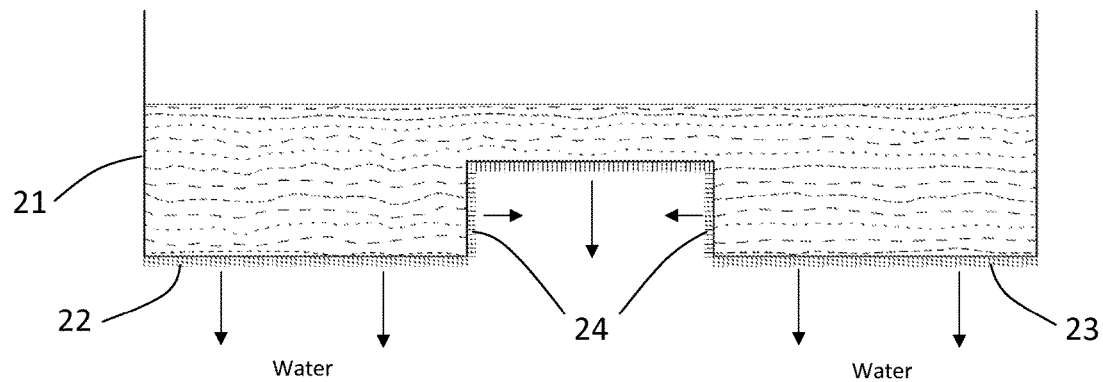
FIG. 3A shows in sideview a mould used in mechanical dewatering of a fibrous foam according to the present invention.

FIG. 3A illustrates mechanical dewatering of a fibrous foam in a mould comprising an upper opening, a water tight wall 21, a first water permeable wall 22 and a second water permeable wall 23 positioned about a three-dimensional male part intruding the mould, the mould further comprising a third water permeable wall 24 fitted around the three-dimensional male part. Water is withdrawn mechanically through the water permeable walls 22, 23, 24 by e.g. suction or gravity or a combination thereof, to give a moist fibrous composition.

Figure 3B:
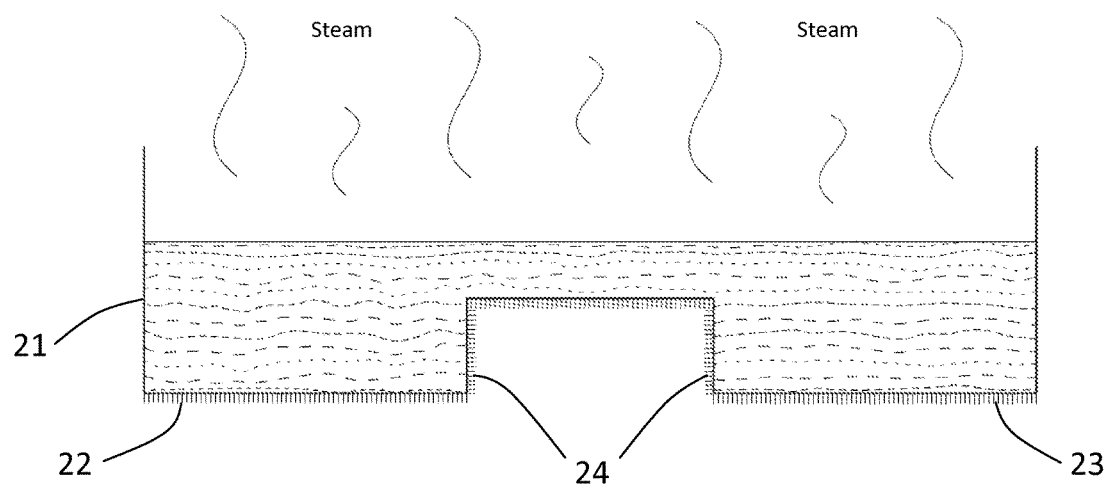
FIG. 3B shows in sideview the mould of FIG. 3A applied to evaporation of water from a solidified moist fibrous composition.
Figure 4:
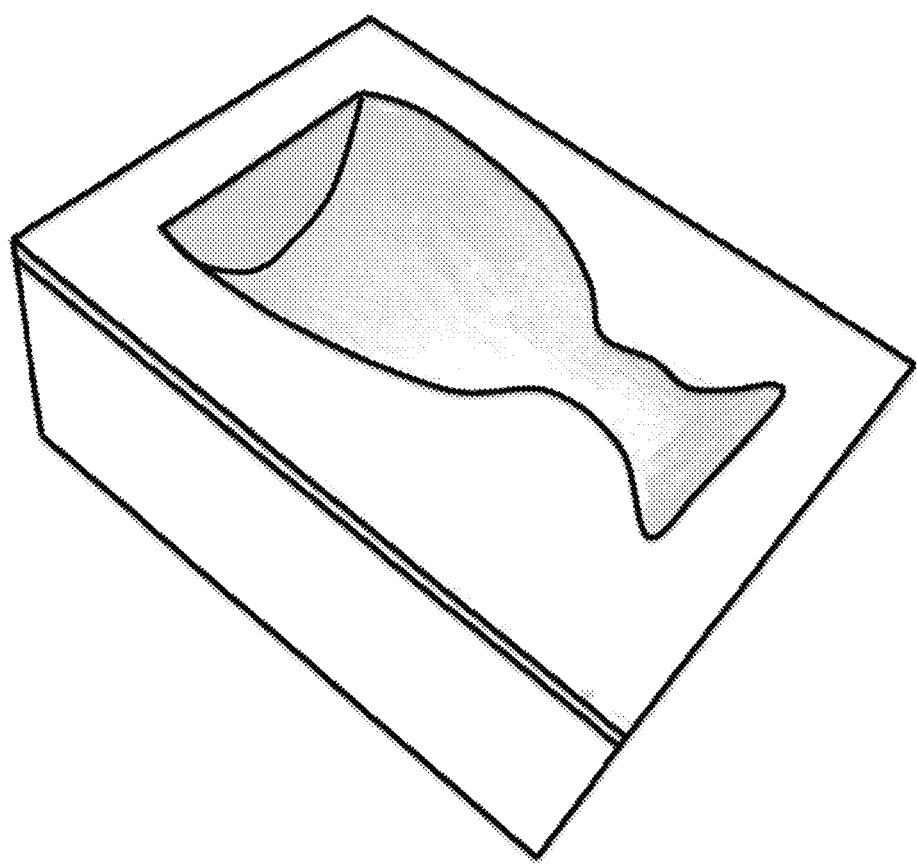
FIG. 4 shows a multilayered moulded fibrous product of the present invention.

FIG. 3B illustrates the evaporation of water from a moist fibrous composition in a mould comprising an upper opening, a water tight wall 21, a first water permeable wall 22 and a second water permeable wall 23 positioned about a three-dimensional male part intruding the mould, the mould further comprising a third water permeable wall 24 fitted around the three-dimensional male part. Water is evaporated from the moist fibrous composition through the upper opening of the mould by e.g. microwaves, infrared waves, air impingement, air drying, and convective drying or combinations thereof, to give a dry fibrous product.

As disclosed herein, embodiments of the present technology provide for composition comprising natural fibres mixed with synthetic fibres. The latter ones can be dispersed evenly throughout the fibrous bulk formed by the natural fibres. The synthetic fibers may also be located primarily on the surfaces of the three-dimensional objects. The objects are typically dried and hardened.

Thus, based on the above, the present products can be comprised of natural fibres and synthetic fibres, which are evenly mixed to form objects which have a uniform density throughout the object, optionally with the exception of the surface layers which can have a higher content of synthetic fibres for improved surface properties (e.g. hardness).

The present products may also be comprised of layered structures formed by overlapping layers on one hand consisting of natural fibres and on the other hand consisting of synthetic fibres, respectively. The number of layers is typically 2 to 50.

Finally the present products may also be comprised of layered structures which contain a plurality of layers, for example 2 to 50 layers, of mixtures of natural fibres and synthetic fibres interspersed by layers (typically 1 to 40) consisting of natural fibres.

LIST OF REFERENCE NUMBERS

1 Foaming
2 Mechanical withdrawal of water
3 Evaporation of water
10 Upper surface of moulded fibres
11 Single layer of moulded fibres
12 Lower surface of moulded cavity
13 Side surface of moulded cavity
14 Upper surface of moulded fibrous product
15 Second layer of moulded fibres
16 Lower surface of moulded cavity
17 Side surface of moulded cavity
18 First layer of moulded fibres
21 Water tight wall
22 First water permeable wall
23 Second water permeable wall
24 Third water permeable wall The following non-limiting examples are intended to merely illustrate the methods and products according to the preferred embodiments of the invention.

EXAMPLES

Example 1

Into 8-10 liters of water was mixed 250 g of unground long fibre cellulose to form a suspension. Into the suspension was added 2 g/l of sodium dodecyl sulphate (SDS) and the suspension was foamed. A first layer of the foamed suspension was poured into a mould with dimensions 500 mm×500 mm. The first layer of the foamed suspension was provided with a blue surface by impregnation of the foam with a dye by suction (15 s). A second layer of the foamed suspension was poured into the mould. After the addition of the second foam, aearation was carried out for 10 seconds. The mould was then placed into a fan-assisted oven at 90° C. for 15-20 hours overnight and the mould was opened the following morning. The moulded fibrous product was then cut to size.

INDUSTRIAL APPLICABILITY

Industries in which the present invention may be applied include packaging, sound proofing and thermal insulation.

As will appear from the above, the present technology is particularly suitable for producing containers, packagings, wrappings and packages, including packages as such as (for example cushioning packages), well as blanks for packages.

In one embodiment, the present technology provides for packages. Particularly interesting packages are formed by relatively thick layers of material. Suitable thicknesses of the layers are 5 mm or more, in particular 7.5 mm up to about 1000 mm, for example 10 mm to 500 mm.

CITATION LIST

Patent Literature

1. GB 2 303 630
2. JP 5 263 400
3. US2002117768
4. JP2010215872
5. WO2012006714

The invention claimed is:

1. A method of forming a molded fibrous product having a density of 5 to 100 kg/m3 and an air content of 90 to 99.5% by volume, said product containing fibers, which are bonded together essentially by hydrogen bonds and an inner part of the product is essentially free from thermoplastic bonding agents and thermoplastic fibers, said method comprising the steps of:
    foaming an aqueous suspension comprising natural fibers to provide a first fibrous foam,
    feeding the first fibrous foam into a mold,
    mechanically withdrawing a part of the water contained in the first fibrous foam to produce a solidified, moist fibrous composition, and
    evaporating water from the solidified, moist fibrous composition to produce a dry fibrous product,
wherein
    water is removed from the fibrous foam by suction,
    the mold comprises an internal surface for receiving the fibrous foam and an opposite external surface, at least one side of the internal surface being made of permeable material adapted to retain fibrous material and to allow passage of water from the internal surface to the external surface, and
    the mold further comprising on the internal surface a protruding three-dimensional male part, covered on the internal surface with a permeable material, said male part corresponding to a cavity in the dry fibrous product, wherein the male part is covered on the internal surface with a permeable material
    the natural fibers have an average length of greater than 0.1 mm.

2. The method according to claim 1, further comprising foaming the aqueous suspension to a fibrous foam having an air content of more than 30% by volume of the foam.

3. The method according to claim 1, wherein the fibrous foam is provided by a method selected from:
    intensive mixing of the aqueous suspension of the fibers;
    reducing of pressure;
    dispersing of air into the aqueous suspension of the fibers by injection; or
    a combination of any of the afore-mentioned methods.

4. The method according to claim 3 wherein reducing of pressure is achieved by increasing temperature of the aqueous suspension of the fibers.

5. The method according to claim 1, wherein the consistency of the aqueous suspension is 0.1-10% based on the weight of the suspension.

6. The method according to claim 1, wherein the moist fibrous foam has a water content of up to 70% by volume of the suspension.

7. The method according to claim 1, wherein the dry fibrous product has a water content of 12% by weight or less.

8. The method according to claim 1, wherein a surfactant is incorporated into the aqueous suspension to enhance foam formation.

9. The method according to claim 1, further comprising forming a homogenous multi-phase mixture by foaming of the aqueous suspension of natural fibers.

10. The method according to claim 1, wherein the mold comprises two internal surfaces which face each other and which allow for removal of water in opposite directions.

11. The method according to claim 1, wherein the suction is applied to the fibrous foam from the external surface of the mold.

12. The method according to claim 1, wherein the suction subjects the fibrous foam to a pressure.

13. The method according to claim 1, wherein evaporation is effected by means selected from the group of microwaves, infrared waves, air impingement, air drying, and convective drying and combinations thereof.

14. The method according to claim 1, wherein a second fibrous foam of fibers is fed into the mold on top of the first fibrous foam so as to cover at least a portion of the first fibrous foam fed into the mold.

15. The method according to claim 14, further comprising feeding into the mold further fibrous foams on top of preceding fibrous foams to form a multilayered dry fibrous product.

16. The method according to claim 14, further comprising removing water and drying of the second or further fibrous foam(s).

17. The method according to claim 14, comprising:
    withdrawing by suction a part of the water contained in the first foam before feeding the second fibrous foam, or
    feeding the first and the second and further foams consecutively into the mold before applying suction in order to withdraw water from the foams.

18. The method according to claim 14, wherein the fibers of the second or further fibrous foam(s) are different from those of the first or of the preceding fibrous foam(s).

19. The method according to claim 1, wherein the fibers of the first fibrous foam are selected from the group of thermomechanical pulp fibers, chemithermomechanical pulp fibers, kraft pulp fibers, sulphite pulp fibers, soda pulp fibers, dissolving pulp fibers, fluff pulp fibers, NBSK pulp fibers, SBSK pulp fibers, recycled pulp fibers, deinked pulp fibers, organosolv pulp fibers, bleached pulp fibers and mixtures thereof.

20. The method according to claim 1, further comprising producing a three-dimensional object having a smallest dimension of at least 5 mm.

21. The method according to claim 20, further comprising producing a package or package material.

22. The method according to claim 1, further comprising foaming the aqueous suspension to a fibrous foam having an air content between 50 and 90% by volume of the foam.

23. The method according to claim 1, wherein the product is essentially free from thermoplastic bonding agents or thermoplastic fibers, and the natural fibers are bonded together only by hydrogen bonds.

24. The method according to claim 1, wherein the fibers are uncut fibers.

25. The method according to claim 1, wherein all fibers of the fibrous product have an average length of greater than 0.1 mm.

26. The method according to claim 1, wherein the fibers of the fibrous product have an average length of greater than 1 mm.

27. The method according to claim 1, wherein the fibers of the fibrous product have an average length in the range of 2 mm to 100 mm.

\* \* \* \* \*